United States Patent
Sugiyama et al.

(10) Patent No.: US 8,631,327 B2
(45) Date of Patent: Jan. 14, 2014

(54) BALANCING LOUDSPEAKERS FOR MULTIPLE DISPLAY USERS

(75) Inventors: Nobukazu Sugiyama, San Diego, CA (US); James Amendolagine, San Marcos, CA (US); Djung Nguyen, San Diego, CA (US)

(73) Assignee: Sony Corporation, Tokyo (JP)

( * ) Notice: Subject to any disclaimer, the term of this patent is extended or adjusted under 35 U.S.C. 154(b) by 184 days.

(21) Appl. No.: 13/357,820

(22) Filed: Jan. 25, 2012

(65) Prior Publication Data

US 2013/0191753 A1    Jul. 25, 2013

(51) Int. Cl.
*G06F 3/16* (2006.01)
*G06F 3/048* (2013.01)
*H04R 29/00* (2006.01)
*H04R 1/10* (2006.01)
*H04R 5/02* (2006.01)

(52) U.S. Cl.
USPC ............. 715/727; 381/59; 381/74; 381/300; 381/310; 715/781

(58) Field of Classification Search
USPC ............. 715/781, 727; 381/74, 59, 300, 310
See application file for complete search history.

(56) References Cited

U.S. PATENT DOCUMENTS

| | | | |
|---|---|---|---|
| 5,561,811 A | 10/1996 | Bier | |
| 6,359,636 B1 | 3/2002 | Schindler et al. | |
| 6,384,840 B1 | 5/2002 | Frank et al. | |
| 6,415,257 B1 | 7/2002 | Junqua et al. | |
| 6,445,400 B1 | 9/2002 | Maddalozzo, Jr. et al. | |
| 6,894,703 B2 | 5/2005 | Vernier et al. | |
| 6,906,696 B2 | 6/2005 | Allport | |
| 7,730,425 B2 | 6/2010 | de los Reyes et al. | |
| 2004/0156512 A1* | 8/2004 | Parker | 381/74 |
| 2006/0097991 A1 | 5/2006 | Hotelling et al. | |
| 2007/0139395 A1 | 6/2007 | Westerman et al. | |
| 2007/0160222 A1 | 7/2007 | Trepte | |
| 2007/0266135 A1 | 11/2007 | Friedland et al. | |
| 2007/0294263 A1 | 12/2007 | Punj et al. | |
| 2009/0094561 A1 | 4/2009 | Do et al. | |
| 2009/0106667 A1 | 4/2009 | Lyle et al. | |
| 2010/0053458 A1 | 3/2010 | Anglin et al. | |
| 2010/0180210 A1 | 7/2010 | Toyama et al. | |
| 2010/0226499 A1 | 9/2010 | De Bruijn et al. | |

OTHER PUBLICATIONS

Liu, Jiayang et al., "User Evaluation of Lightweight User Authentication with a Single Tri-Axis Accelerometer," MobileHCI'09, Bonn, Germany, Sep. 15-18, 2009.

(Continued)

*Primary Examiner* — Ting Lee
(74) *Attorney, Agent, or Firm* — Miller Patent Services; Jerry A. Miller

(57) ABSTRACT

A method consistent with the present invention involves displaying a window on a computer monitor; at one or more programmed processors, determining a position of the window on the computer monitor; at the one or more programmed processors, deducing a user position for a user of the window with the window based on the position of the window on the computer monitor; and steering audio signals from an application running in the window to a loudspeaker in an array of loudspeakers, where the loudspeaker is a loudspeaker in the array of loudspeakers closer to the deduced user position than another loudspeaker in the array. This abstract is not to be considered limiting, since other embodiments may deviate from the features described in this abstract.

26 Claims, 9 Drawing Sheets

(56) References Cited

OTHER PUBLICATIONS

Patil, Abhishek et al., U.S. Appl. No. 13/105,766, filed May 11, 2011.
Amendolagine, James et al., U.S. Appl. No. 13/238,006, filed Sep. 21, 2011.
Amendologine, James et al., Corrected Application Papers, U.S. Appl. No. 13/238,006, filed Sep. 21, 2011; Nov. 17, 2011.
Sugiyama, Nobukazu et al., U.S. Appl. No. 13/238,017, filed Sep. 21, 2011.
Sugiyama, Nobukazu et al., Corrected Application Papers, U.S. Appl. No. 13/238,017, filed Sep. 21, 2011; Nov. 9, 2011.

* cited by examiner

BALANCING LOUDSPEAKERS FOR MULTIPLE DISPLAY USERS

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

As computer display prices fall and display sizes increase, there are more opportunities for multiple users to share a single large screen. When audio is used, it is desirable for each user's audio to be distinguishable from other users. The position of a user can be identified by a location that the user touches a touchscreen display in order to change the audio source, but this may result in the apparent sound source changing frequently as the user interacts with the display and, depending upon the application in use, may skew the audio sources based upon the user's interaction.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
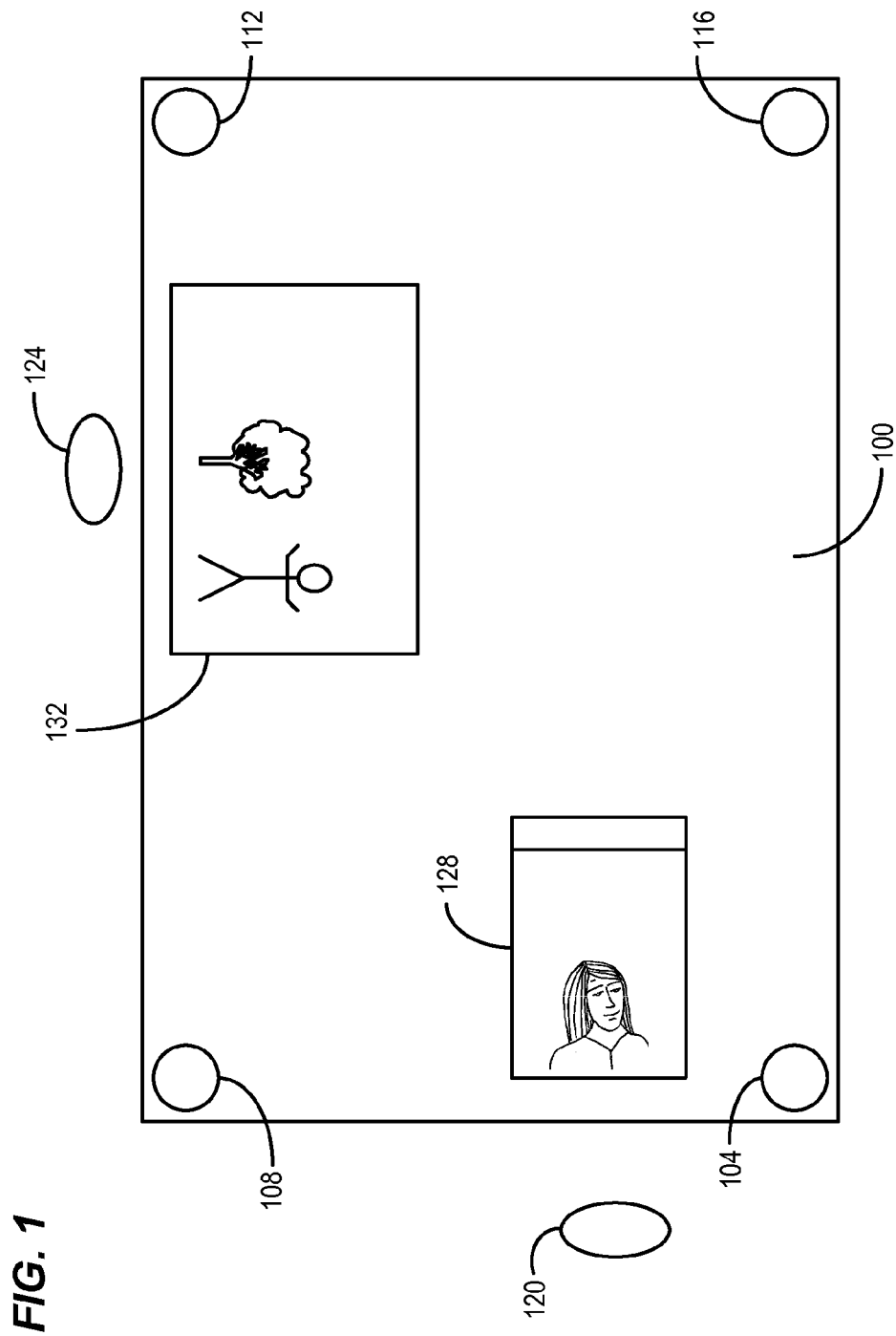
FIG. 1 is an example of a display and speaker system arrangement consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a script, a program module, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As computer display prices fall and display sizes increase, there are more opportunities for multiple users to share a single large screen. In order to give each user to have a better audio experience, audio volume for each speaker can be adjusted based on the location of window on screen or the owner of the window. For vertically oriented displays, the position can be simply a horizontal position, while display tables can accommodate positions around the table as well as varying orientations of the windows on the screen. The position of a user can be identified by a location that the user touches a touchscreen display, but this may result in the apparent sound source changing frequently as the user interacts with the display and, depending upon the application in use, may skew the audio sources based upon the user's interaction.

When multiple users share a single display, usually they also share the same audio. However, it is more desirable in many situations for each user to have his or her own audio available in a manner that that user can utilize. It is therefore desirable to identify each user and output the audio from the closest speaker to the user. In accord with certain implementations, the position of a window on screen can be used to adjust speaker volume and selection based on the window position. By adjusting the audio, user can hear the audio related to the window or windows that the user is using or creates. If there are audio jacks, the user can listen only the audio which the user is currently using.

By way of example of a process consistent with certain implementations, a user can Power on an LCD touch table or similar display. User A starts a new session in the middle of screen. The speaker level is adjusted to the center. User B starts a new session on the left side and User A moves to right side of table. The sound associated with the window for User A is changed so that it comes from mainly right speaker, and the sound associated with the window for User B is changed so that it comes mainly from the left speaker. Other example scenarios can be described consistent with the present teachings.

Turning now to FIG. 1, consider an example display in the form of a display table 100 having a loudspeaker (104, 108, 112, and 116) at each of the four corners. Multiple users such as 120 and 124 can utilize this display 100 simultaneously running multiple software programs in multiple windows such as 128 and 132 using a single computer system (i.e. a single processor or multi-processor computer system where users 120 and 124 are sharing a common computer monitor 100).

When one or more of the software programs running in windows 128 and 132 has associated audio, it is often desirable for the audio program to be steered to speakers at the location of the user that is actually using the program. So, it is desirable to steer (by switching to a particular loudspeaker in an array of loudspeakers or by adjusting the relative volume of the audio signal going to the loudspeakers). A number of schemes can be used to direct the audio to a particular user once the location of the user is ascertained. Such schemes include, but are not limited to:

Selecting a single speaker that is closest to the user;
Selecting a pair of speakers situated on the left and right of the user;
Utilizing psycho-acoustic signal processing for sound localization to locate the sound at a location in front of the user or to balance the audio on each side of the user.

Windows are normally defined using a software command or commands that draw the window on the display at a specified X-Y position for a portion of the window and size information. Operating systems retain this information for each window. From this information the length of the bottom of the window can be determined and from that information, the center position of the bottom of the window is readily determined Once a window's location and orientation (i.e., rotation with respect to a reference axis system), the processor can ascertain where the center of the window is along the direction of the bottom of the window so that the user can be presumed or deduced to be situated approximately central to the window and in front of the window for vertically oriented displays or in the case of display 100, the user is presumed to be closest to the bottom of the window and centered along the bottom of the window. Based on this knowledge, the user's position is deduced and the loudspeakers can be selected or the signals to the loudspeakers altered accordingly with the objective being to reduce interference in the audio between multiple users and to give each user his or her own audio program emanating from one or more speakers close to the user.

In the example of FIG. 1, user 120 might desirably have sound associated with window 128 emanate from speaker 104. Similarly, user 124 might desirably have sound associated with application window 132 emanate from speaker 112. In both cases, the selected speaker is the one closest to the user's deduced position. However, in some instances, it is desirable to have one or both users experience the audio in stereo. In such cases, the audio associated with window 128 can emanate from speakers 104 and 108, while the audio associated with window 132 can emanate from speakers 108 and 112. In such cases, there is an overlap of the audio directed to the two users 120 and 124 may be present, but should be less disturbing to each user than if all audio came from all speakers. Psycho-acoustic signal processing can be utilized to adjust the apparent location from which the audio emanates if desired, but may result in further overlap in the audio heard by individual users. In the present example, if user 120 moved window 128 to the lower side of the display table between loudspeakers 104 and 116, the present method would begin using those loudspeakers for the audio associated with window 128 and each of the user's audio would be more totally isolated from each other.

Figure 2:
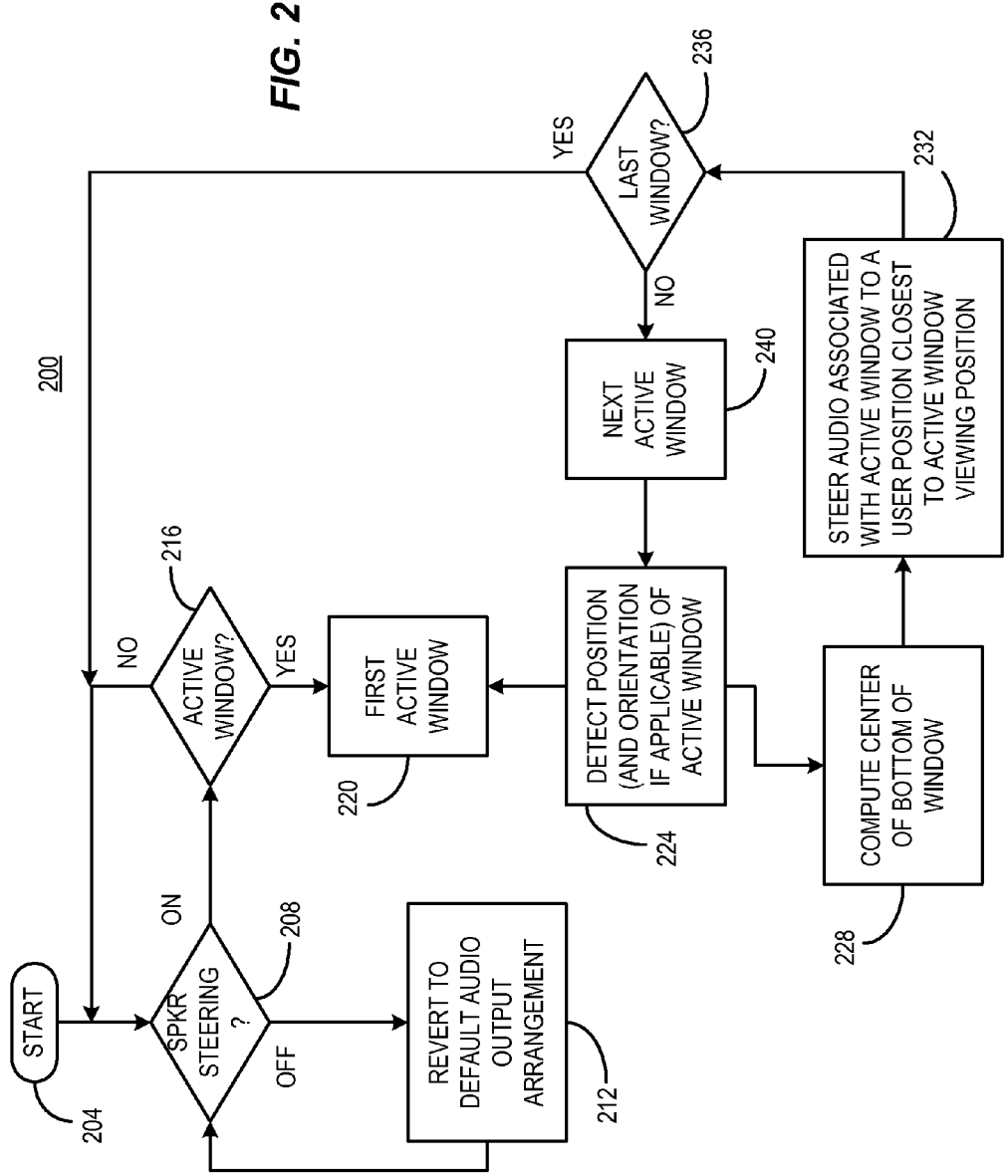
FIG. 2 is an example of a flow chart of a process consistent with certain embodiments of the present invention.

Referring to FIG. 2, an example process 200 consistent with certain implementations of the present invention is depicted in flow chart form. In this example process, starting at 204, it is contemplated that the features described for position detection and speaker steering may be enabled or disabled by the user and the state of operation of the feature is detected at 208. If the feature is disabled at 208, a default speaker configuration (in terms of how audio from active program windows is directed to the available speaker array) is implemented at 212. For example, one default configuration would involve all audio being sent to all speakers, or an arrangement where all left and right stereo audio is directed to alternating speakers as the speakers are encountered around the perimeter of the display.

When it is determined that the feature has been activated at 204, then at 216 the process determines if any windows are present and active. If not, control returns to 204 and decisions 204 and 216 loop until a window is opened and active at 216. At this point, control passes to processing the first active window at 220. At 224, the position and possibly the orientation of the window (depending upon whether or not the display is vertical or horizontal since an orientation is implied in vertical displays) are determined. At 228, the center of the bottom of the current active window is computed as a reference for deducing the position of the user of the currently active window. At 232, the audio is steered in any suitable manner as discussed above to the speakers such that the audio is directed to the speaker or speakers closest to the deduced location of the user associated with the current window being processed.

If the current window is not the last active window to be processed at 236 the process increments to the next active window at 240 and the process returns to 224 in order to process the next active window in a similar manner. When the last active window is encountered at 236, control returns to 208. This process flow enables continuous updating of the position of the window and the speakers selected. In alternative embodiments, once all active windows are processed, the process can simply look for changes and process accordingly. Other variations will occur to those skilled in the art upon consideration of the present teachings.

Figure 3:
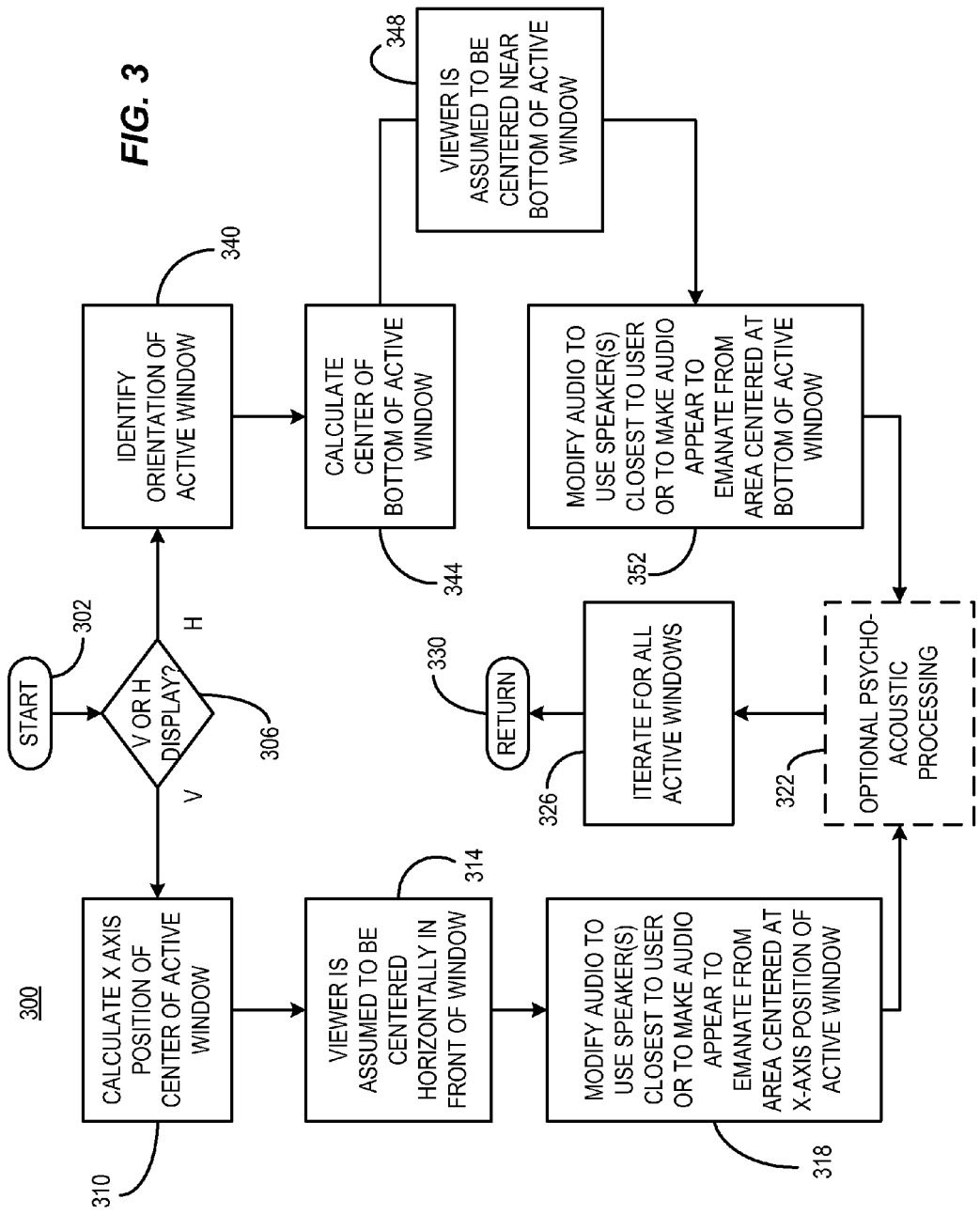
FIG. 3 is another example of a flow chart of a process consistent with certain embodiments of the present invention.

Referring to FIG. 3, a process 300 describing an implementation of certain embodiments is depicted starting at 302 where a determination is made by user input or detection of a model number for example, as to whether or not the current display is vertically or horizontally oriented. In this process, a definition of the speaker configuration may be implicit or defined for the particular display configuration. If the display is vertically oriented at 306, control passes to 310 where the X axis position of the current window is determined. For a vertical display, the user can be presumed to be centered in front of the window at 314 to establish a deduced position of the user. The audio signals can then be modified at 318 to utilize one or more loudspeakers situated in close physical proximity to the deduced location of the user. This can mean using a single speaker closest to the user or a pair of speakers in an array configured to produce audio at the user's deduced location. This can optionally at 322 utilize psycho-acoustic effects to provide the user with a balanced stereo sound at the deduced location. This process can be iterated at 326 as in process 200 to carry out the same process for each active window before returning at 330.

If the display is determined to be horizontal at 306, the process proceeds to 340, where the orientation of the current active window is determined. This involves determining a rotation of the window with respect to an arbitrary reference direction so that the bottom of the window can be identified. At 344, the center of the bottom of the window is calculated. The process then proceeds to 348 where the user is presumed to be situated at a position near the center of the bottom of the active window along the perimeter of the horizontal display. At 352, the audio is steered to one or more loudspeakers determined to be close to the user's deduced position so as to provide the user with a suitable audio experience. Control then passes to 322 (optionally) where psycho-acoustic techniques can be applied, and the process is iterated at 326 for all active windows before returning at 330.

Figure 4:
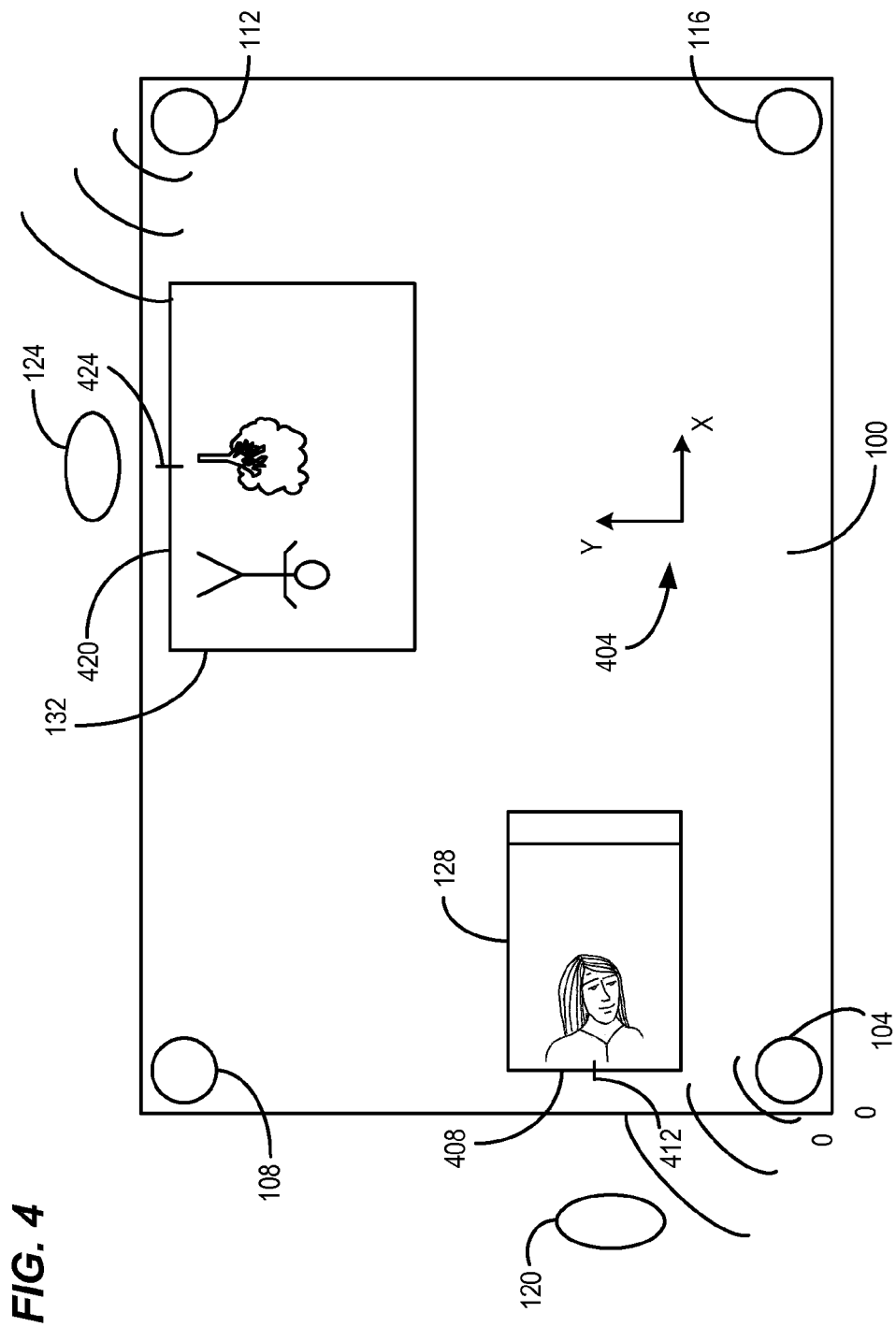
FIG. 4 is an example of the display table of FIG. 1 depicting identification of the deduced user position in a manner consistent with certain embodiments of the present invention.

Using computer display 100 as an example, one implementation of the above processes are depicted in FIG. 4. In this example, a coordinate system 404 is used as a reference with the origin of the system appearing at the lower left corner of the display with 0,0 indicated at this corner. The angular orientation of window 128 is 90 degrees rotation clockwise with respect to the coordinate system. The lower edge 408 of the window is thus 90 degrees rotated from the reference axis. The center of the lower edges is shown at 412 and can be extended to the left to a point just beyond the edge of the display as a deduced location of user 120. User 124's position is similarly deduced by determining that the window 132 is oriented at a 180 degree rotation from the reference axis. The lower edge of the window is thus at the top of this drawing at edge 420. The center of this edge 420 is located at 424 thereby indicated a deduced position of user 124 outside the edge of the display along a vertical line through center 424. With these positions determined, speaker 104 is turned on for the audio associated with window 128 since this speaker is closest to the deduced position. Similarly, speaker 112 is turned on for the audio associated with window 132. Depending upon the particular implementation or configuration of the implementation, loudspeaker 108 can also be turned on for either window 128 or window 132 or both when a stereophonic audio output is preferred.

Figure 5:
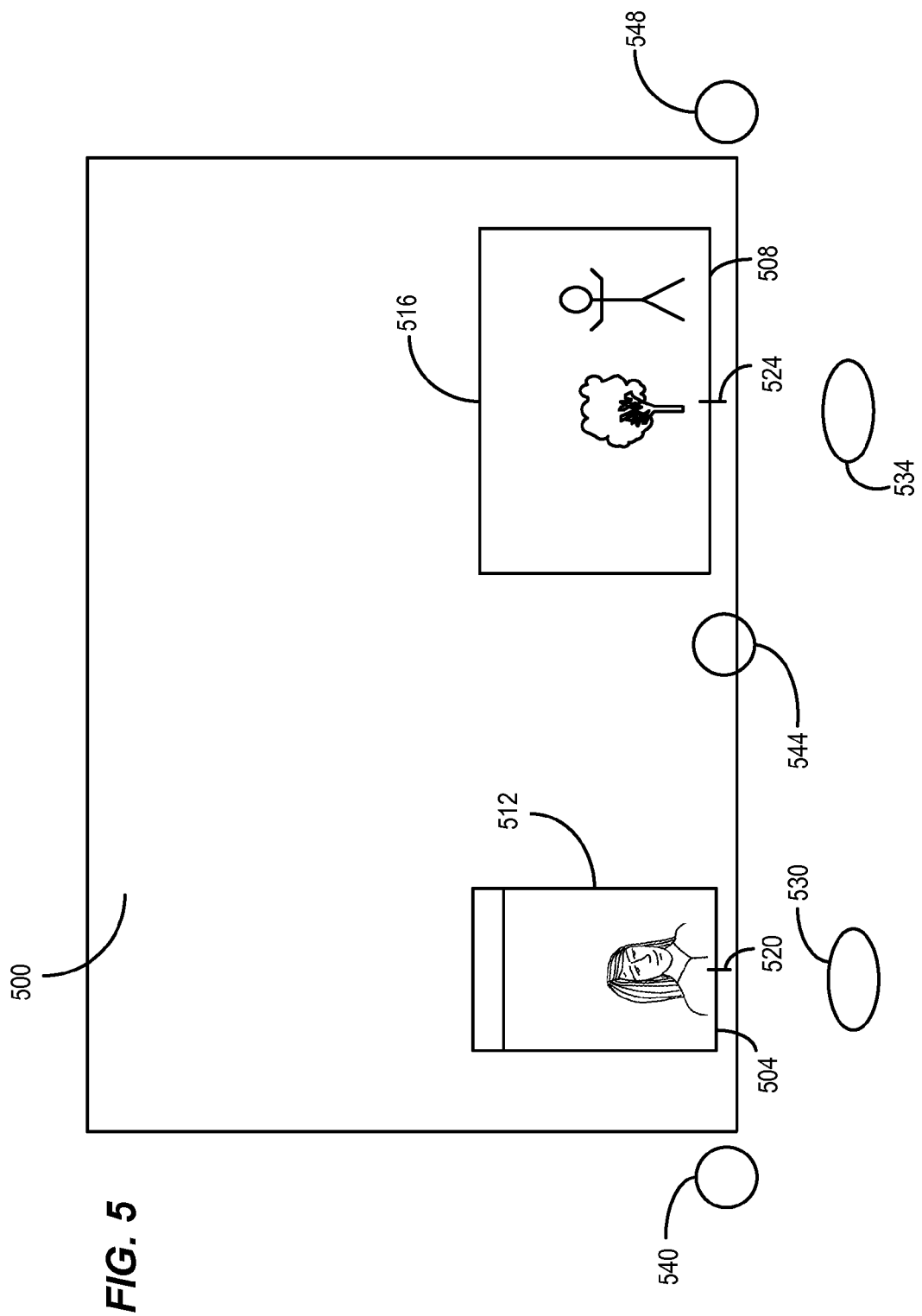
FIG. 5 is an example of a vertically oriented display used in a manner consistent with certain embodiments of the present invention.

With reference to FIG. 5, when the above process is applied to a vertically oriented display 500, the process is somewhat simplified since the orientation can always be presumed to be the same with the lower edges 504 and 508 of windows 512 and 516 being parallel to the horizontal. The centers 520 and 524 of these lower edges is readily ascertained and the deduced positions of the users 530 and 534 are determined to be in front of the display at approximately the X position defined by the center of the lower edge of their respective windows.

In this example, three loudspeakers 540, 544 and 548 are depicted in the array. In an illustrative embodiment, the loudspeaker 540 may be selected to be associated with window 512 while loudspeaker 548 may be selected to be associated with window 516. It is significant that selection of a speaker may also be based upon obtaining optimum separation of the audio, so in this simple example, if the center 524 is actually closer to speaker 544, it may still be desirable to select a close speaker 548 that provides more separation from user deduced position 530. Also of note is that speaker 544 may be used for stereo reproduction for one channel of each of the user positions in the illustrated embodiment with speaker 544 serving as a left channel speaker for 516 and/or right channel speaker for 512.

The following constraints may need to be considered when determining whether or not psycho-acoustic processing is utilized in connection with implementations consistent with the present embodiments. Psycho-acoustic processing as discussed herein is intended to encompass primarily the use of signal processing to modify sound localization as perceived by a user of the display system. For example, in the example of FIG. 4, user 120 is located substantially closer to speaker 104 than 108. A modification of the sound coming from speaker 108 can be used to create a balanced stereo sound to user 120 and appear to be centered at horizontal position 412. However, in doing so, consideration is preferably given to the presence of user 124. If both users 120 and 124 are to utilize loudspeaker 108, the output of speaker 108 may interfere with each user. Hence, it is best to utilize sound localization processing judiciously whenever users are either sharing a loudspeaker or when a user is close to a loudspeaker that will be used by another user. Of course, if user 124 were finding it disturbing to share loudspeaker 108, movement to a position to the right edge of the display 100 would likely remedy the issue in this simple example.

Figure 6:
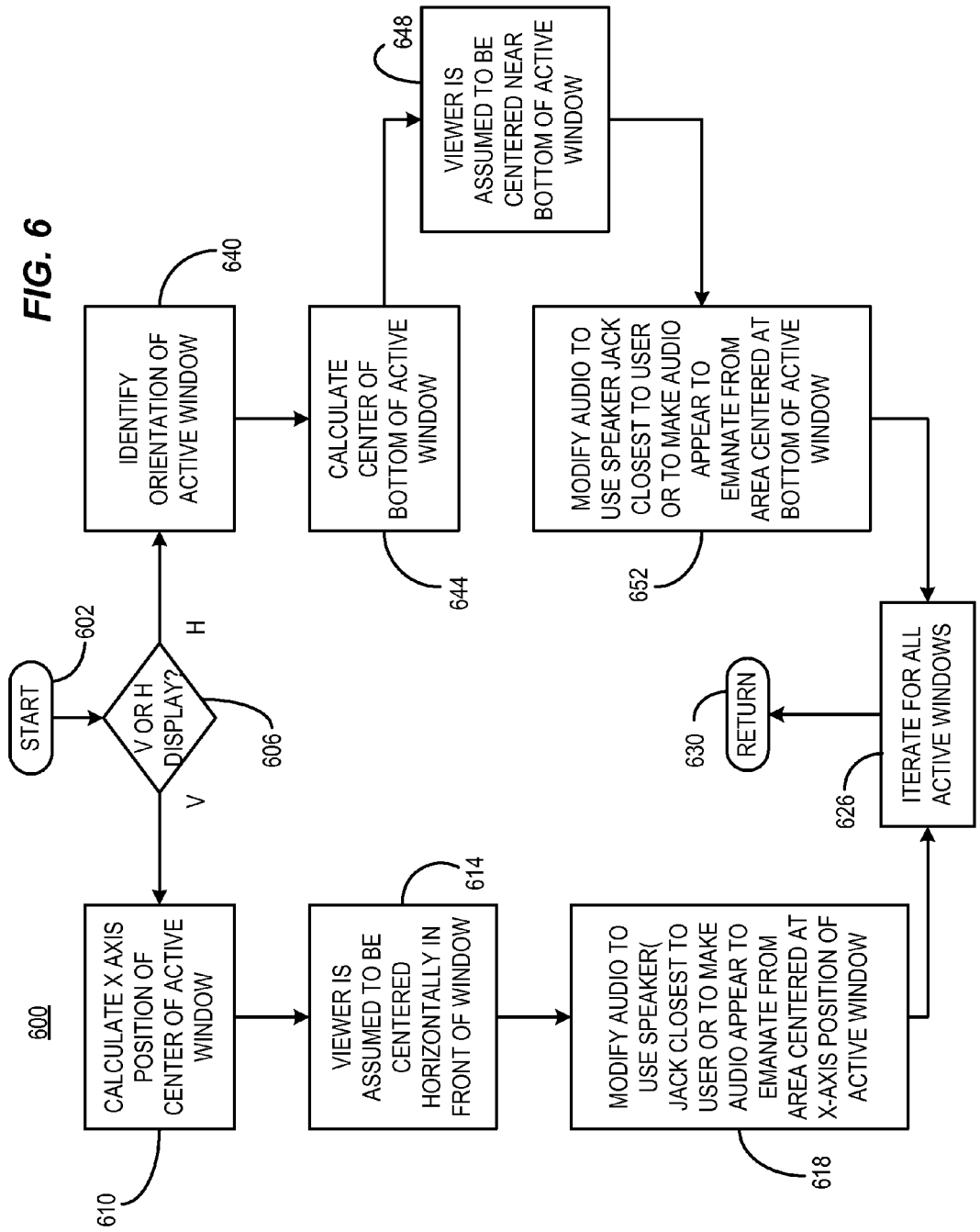
FIG. 6 is an example of a flow chart of a process consistent with certain embodiments of the present invention.

A variation of the process of FIG. 3 is shown as a process 600 of FIG. 6. In this variation, rather than shifting speaker use, shifting an active headphone jack is provided in an implementation depicted starting at 602 where a determination is made by user input or detection of a model number for example, as to whether or not the current display is vertically or horizontally oriented. In this process, an array of headphone jacks is provided about the periphery of the display and a definition of the headphone jack configuration may be implicit or defined for the particular display configuration. If the display is vertically oriented at 606, control passes to 610 where the X axis position of the current window is determined. For a vertical display, the user can be presumed to be centered in front of the window at 614 to establish a deduced position of the user. The audio signals can then be modified at 618 to utilize one or more headphone jacks situated in close physical proximity to the deduced location of the user. Since the audio is highly segregated when headphones are in use, this generally means providing stereo audio to the headphone jack for a particular user's deduced location. This can optionally at 322 utilize psycho-acoustic effects to provide the user with a balanced stereo sound at the deduced location. This process can be iterated at 626 in a manner similar to that used in process 200 to carry out the same process for each active window before returning at 630.

If the display is determined to be horizontal at 606, the process proceeds to 640, where the orientation of the current active window is determined. This involves determining a rotation of the window with respect to an arbitrary reference direction so that the bottom of the window can be identified. At 644, the center of the bottom of the window is calculated. The process then proceeds to 648 where the user is presumed to be situated at a position near the center of the bottom of the active window along the perimeter of the horizontal display. At 652, the audio is steered to one or more headphone jacks determined to be closest to the user's deduced position so as to provide the user with a suitable audio experience. The process is iterated at 626 for all active windows before returning at 330. It is noted that multiple headphone jacks may be made active for a window that is close to a user. For example, if only one user is present on a particular side of a display table, all jacks on that side might be activated.

Figure 7:
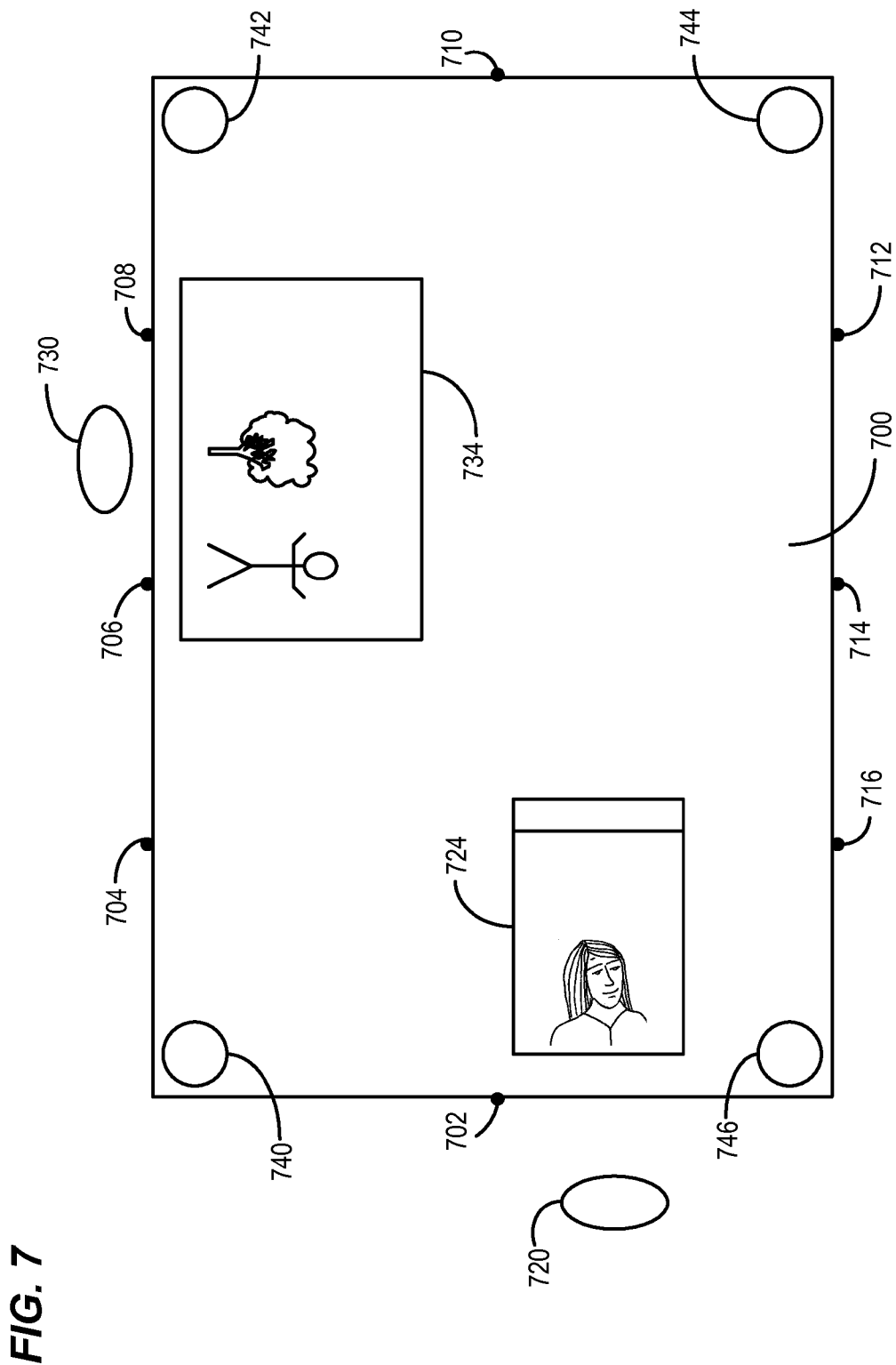
FIG. 7 is an example of a display table used in a manner consistent with certain embodiments of the present invention.

FIG. 7 depicts an example display table 700 in which eight headphone jacks 702, 704, 706, 708, 710, 712, 714 and 716 are provided about the perimeter of the display table. A user 720 is utilizing window 724 and user 730 is utilizing window 734. In this case, the deduced locations of users 720 and 730 are identified in the manner previously described. In the case of user 720, headphone jack 702 may be activated. In the case of user 730, headphone jacks 706 and 708 may be activated. In alternative implementations, jack 704 may be activated for the audio associated with window 734 also, and it may be desirable to activate jack 716 for the audio associated with window 724. Many variations will occur to those skilled in the art upon consideration of the present teachings. It is noted that when headphones are in use, the loudspeakers 740, 742, 744 and 746 may be turned off or may be operational as desired either using the present audio steering or a default configuration.

Figure 8:
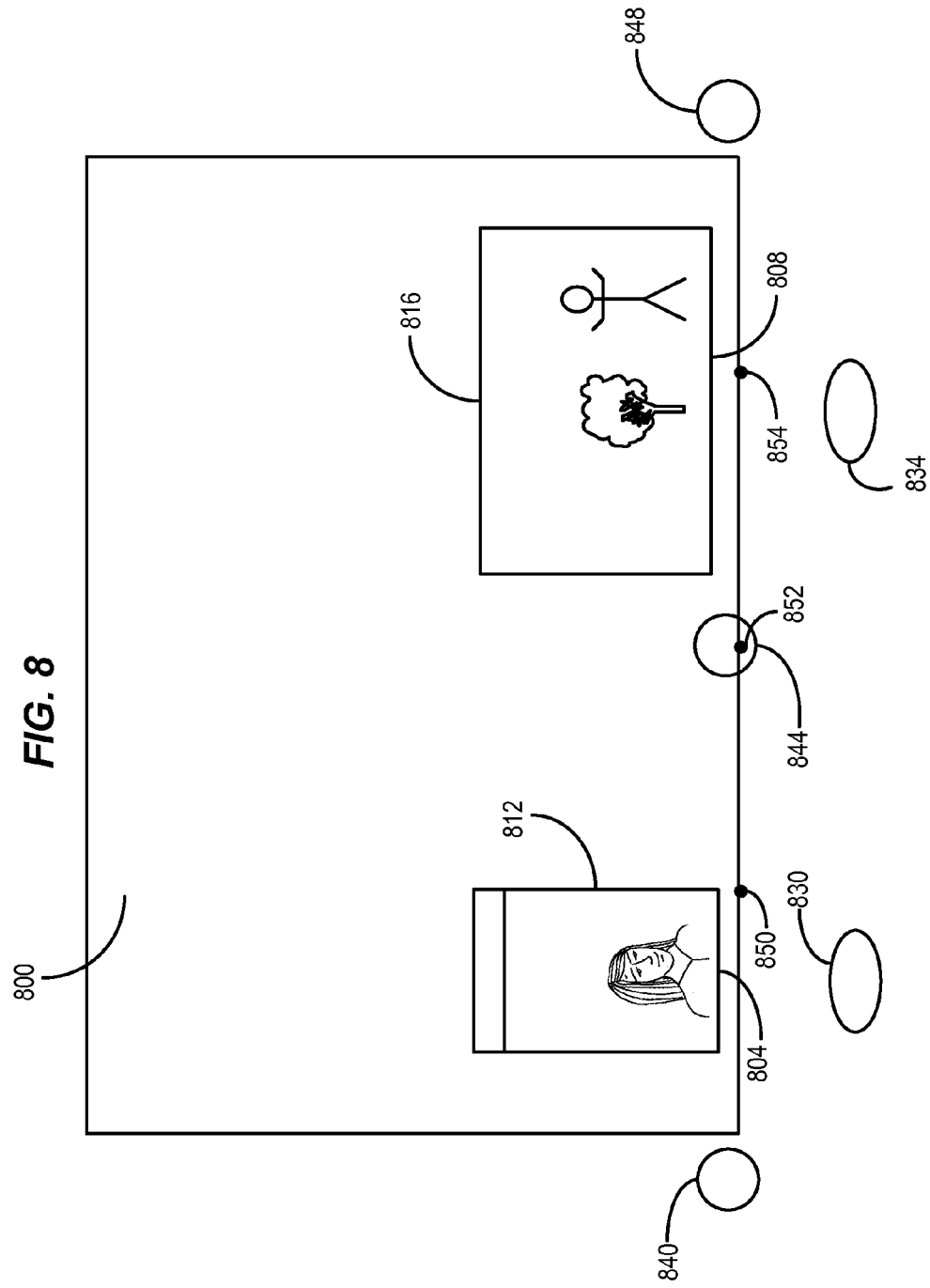
FIG. 8 is an example of a vertically oriented display used in a manner consistent with certain embodiments of the present invention.

With reference to FIG. 8, when the above process is applied to a vertically oriented display 800, the process is somewhat simplified since the orientation can always be presumed to be the same with the lower edges 804 and 808 of windows 812 and 816 being parallel to the horizontal. The centers of these lower edges is readily ascertained and the deduced positions of the users 830 and 834 are determined to be in front of the display at approximately the X position defined by the center of the lower edge of their respective windows.

In this example, three loudspeakers 840, 844 and 848 are depicted in the array, but may be inactive or set for output as described above. Headphone jacks 850, 852 and 854 are shown in an array along the bottom of the display. In an illustrative embodiment, the headphone jack 850 may be selected to be associated with window 812 while headphone jack 854 may be selected to be associated with window 816. Jack 852 may be manually assigned or assigned to the closest window 816. Other variations will occur to those skilled in the art upon consideration of the present teachings.

Figure 9:
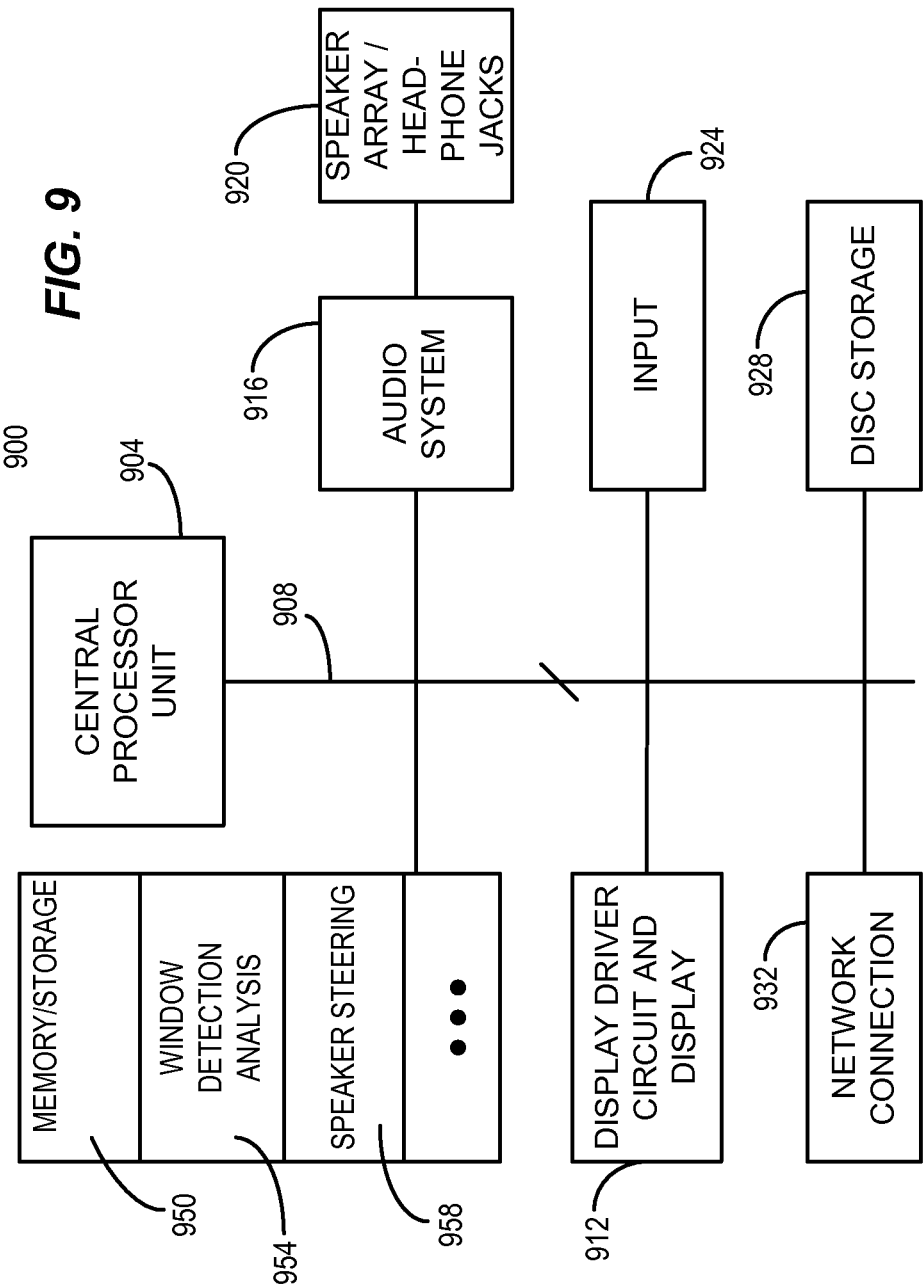
FIG. 9 is an example of a computer system implementation consistent with certain embodiments of the present invention.

The processes depicted in the flow charts above may be carried out by a special purpose circuit designed for window detection analysis and speaker steering or may be carried out on a computer circuit using one or more programmed processors such as processor 904 as depicted in FIG. 9 for circuit 900. One or more communication buses 908 are used to permit processor 904 to communicate with various circuit elements such as a display driver circuit and display 912. An audio system 916 operates under control of the processor 904 to drive a speaker array and/or headphone jacks 920. An input system such as keyboard, touchscreen, mouse or other input devices 924 are also in communication with processor 904. The system may also have disc storage 928 and network connection interfaces 932.

The program instructions used in carrying out the above-described processes can be stored in memory 950 which may serve as working memory for processor 904 as well as storing operating system and other basic service programs. Memory 950 carries stores instructions for detection of the window on the display at 954 which may be in the form of a computer program module and for steering to speakers or headphone jacks at 958 which may be in the form of a program module. The program functions can be arranged in any operative manner without departing from the teaching herein.

Thus, a method consistent with certain implementations involves displaying a window on a computer monitor; at one or more programmed processors, determining a position of the window on the computer monitor; at the one or more programmed processors, deducing a user position for a user of the window with the window based on the position of the window on the computer monitor; and steering audio signals from an application running in the window to a loudspeaker in an array of loudspeakers, where the loudspeaker is a loudspeaker in the array of loudspeakers closer to the deduced user position than another loudspeaker in the array.

In certain implementations, steering involves causing the audio signals to be directed to a single loudspeaker situated closest to the deduced user position. In certain implementations, the steering involves causing the audio signals to be directed to a pair of loudspeakers situated closest to the left and right of the deduced user position. In certain implementations, the steering further involves causing psycho-acoustically processing the audio signals to center the audio signal at the deduced user position. In certain implementations, determining the position further involves determining an orientation of the window. In certain implementations, determining the position further involves determining a central position of a bottom edge of the window. In certain implementations, determining the position further involves determining a central position of a bottom edge of the window. In certain implementations, the determining, deducing and steering are iterated for another window displayed on the display.

A computer display system consistent with certain implementations has a computer monitor displaying a window and an array of loudspeakers. One or more programmed processors are programmed to determine a position of the window on the computer monitor; deduce a user position for a user of the window with the window based on the position of the window on the computer monitor; steer audio signals from an application running in the window to a loudspeaker in the array of loudspeakers, where the loudspeaker is a loudspeaker in the array of loudspeakers closer to the deduced user position than another of the loudspeakers in the array.

In certain implementations, the steering involves causing the audio signals to be directed to a single loudspeaker situated closest to the deduced user position. In certain implementations, the steering involves causing the audio signals to be directed to a pair of loudspeakers situated closest to the left and right of the deduced user position. In certain implementations, the steering involves causing psycho-acoustic processing of the audio signals to center the audio signal at the deduced user position. In certain implementations, determining the position further involves determining an orientation of the window. In certain implementations, determining the position further involves determining a central position of a bottom edge of the window. In certain implementations, determining the position further involves determining a central position of a bottom edge of the window. In certain implementations, the processor iterates the determining, deducing and steering for another window displayed on the display.

Another computer display system has a computer monitor displaying a window and an array of loudspeakers. One or more programmed processors are programmed to: determine an orientation of the window on the computer monitor; determine a position of the window on the computer monitor by determining a position of a center of a bottom of the window; deduce a user position for a user of the window with the window based on the position of the window on the computer monitor; steer audio signals from an application running in the window to a loudspeaker in the array of loudspeakers, where the loudspeaker is a loudspeaker in the array of loudspeakers closer to the deduced user position than another loudspeaker in the array of loudspeakers.

In certain implementations, the steering involves causing the audio signals to be directed to a single loudspeaker situated closest to the deduced user position. In certain implementations, the steering involves causing the audio signals to be directed to a pair of loudspeakers situated closest to the left and right of the deduced user position. In certain implementations, the steering further involves causing psycho-acoustically processing the audio signals to center the audio signal at the deduced user position. In certain implementations, the processor iterates the determining, deducing and steering for another window displayed on the display.

Another method involves displaying a window on a computer monitor; at one or more programmed processors, determining a position of the window on the computer monitor; at the one or more programmed processors, deducing a user position associated with the window based on the position of the window on the computer monitor; steering audio to a headphone jack in an array of headphone jacks, where the headphone jack is a headphone jack in the array of headphone jacks closest to the deduced user position.

In certain implementations, determining the position further involves determining an orientation of the window. In certain implementations, determining the position further involves determining a central position of a bottom edge of the window. In certain implementations, determining the position further involves determining a central position of a bottom edge of the window. In certain implementations, the determining, deducing and steering are iterated for another window displayed on the display.

Another computer display system has a computer monitor displaying a window and an array of headphone jacks. One or more programmed processors are programmed to: determine a position of the window on the computer monitor; deduce a user position associated with the window based on the position of the window on the computer monitor; and steer audio to a headphone jack in an array of headphone jacks, where the headphone jack is a headphone jack in the array of headphone jacks closest to the deduced user position.

In certain implementations, determining the position further involves determining an orientation of the window. In certain implementations, determining the position further involves determining a central position of a bottom edge of the window. In certain implementations, determining the position further involves determining a central position of a bottom edge of the window. In certain implementations, the processor iterates the determining, deducing and steering for another window displayed on the display.

Those skilled in the art will recognize, upon consideration of the above teachings, that certain of the above exemplary embodiments are based upon use of one or more programmed processors programmed with a suitable computer program. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium such as a non-transitory storage medium, where the term "non-transitory" is intended to exclude propagating signals and not memory that can be rewritten or memory that loses its contents when power is removed. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping, time outs, etc. can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method, comprising:
    displaying a window on a computer monitor;
    at one or more programmed processors, determining a position of the window on the computer monitor by determining a position of at least one edge of the window, where determining the position further comprises determining an orientation of the window;
    at the one or more programmed processors, deducing a user position for a user of the window with the window based on the position and orientation of the window on the computer monitor; and
    steering audio signals from an application running in the window to a loudspeaker in an array of loudspeakers, where the loudspeaker is a loudspeaker in the array of loudspeakers closer to the deduced user position than another loudspeaker in the array.

2. The method according to claim 1, where the steering comprises causing the audio signals to be directed to a single loudspeaker situated closest to the deduced user position.

3. The method according to claim 1, where the steering comprises causing the audio signals to be directed to a pair of loudspeakers situated closest to the left and right of the deduced user position.

4. The method according to claim 3, where the steering further comprises causing psycho-acoustically processing the audio signals to center the audio signal at the deduced user position.

5. The method according to claim 1, where determining the position further comprises determining a central position of a bottom edge of the window.

6. The method according to claim 1, where determining the position further comprises determining a central position of a bottom edge of the window.

7. The method according to claim 1, where the determining, deducing and steering are iterated for another window displayed on the display.

8. A computer display system, comprising:
    a computer monitor displaying a window;
    an array of loudspeakers; and
    one or more programmed processors programmed to:
        determine a position of the window on the computer monitor by determining a position of at least one edge of the window, where determining the position further comprises determining an orientation of the window;
        deduce a user position of a user of the window with the window based on the position and orientation of the window on the computer monitor;
        steer audio signals from an application running in the window to a loudspeaker in the array of loudspeakers, where the loudspeaker is a loudspeaker in the array of loudspeakers closer to the deduced user position than another of the loudspeakers in the array.

9. The system according to claim 8, where the steering comprises causing the audio signals to be directed to a single loudspeaker situated closest to the deduced user position.

10. The system according to claim 8, where the steering comprises causing the audio signals to be directed to a pair of loudspeakers situated closest to the left and right of the deduced user position.

11. The system according to claim 10, where the steering comprises causing psycho-acoustically processing the audio signals to center the audio signal at the deduced user position.

12. The system according to claim 8, where determining the position further comprises determining a central position of a bottom edge of the window.

13. The system according to claim 8, where the processor iterates the determining, deducing and steering for another window displayed on the display.

14. A computer display system, comprising:
a computer monitor displaying a window;
an array of loudspeakers; and
one or more programmed processors programmed to:
  determine an orientation of the window on the computer monitor;
  determine a position of the window on the computer monitor by determining a position of a center of a bottom of the window;
  deduce a user position for a user of the window with the window based on the position and orientation of the window on the computer monitor;
  steer audio signals from an application running in the window to a loudspeaker in the array of loudspeakers, where the loudspeaker is a loudspeaker in the array of loudspeakers closer to the deduced user position than another loudspeaker in the array of loudspeakers.

15. The system according to claim 14, where steering comprises causing the audio signals to be directed to a single loudspeaker situated closest to the deduced user position.

16. The system according to claim 14, where the steering comprises causing the audio signals to be directed to a pair of loudspeakers situated closest to the left and right of the deduced user position.

17. The system according to claim 16, where the steering further comprises causing psycho-acoustically processing the audio signals to center the audio signal at the deduced user position.

18. The system according to claim 16, where the processor iterates the determining, deducing and steering for another window displayed on the display.

19. A method, comprising:
displaying a window on a computer monitor;
at one or more programmed processors, determining a position of the window on the computer monitor by determining a position of at least one edge of the window, where determining the position further comprises determining an orientation of the window;
  at the one or more programmed processors, deducing a user position associated with the window based on the position and orientation of the window on the computer monitor;
  steering audio from an application running in the window to a headphone jack in an array of headphone jacks, where the headphone jack is a headphone jack in the array of headphone jacks closest to the deduced user position.

20. The method according to claim 19, where determining the position further comprises determining a central position of a bottom edge of the window.

21. The method according to claim 19, where determining the position further comprises determining a central position of a bottom edge of the window.

22. The method according to claim 19, where the determining, deducing and steering are iterated for another window displayed on the display.

23. A computer display system, comprising:
a computer monitor displaying a window;
an array of headphone jacks; and
one or more programmed processors programmed to:
determine a position of the window on the computer monitor by determining a position of at least one edge of the window, where determining the position further comprises determining an orientation of the window;
deduce a user position associated with the window based on the position and orientation of the window on the computer monitor; and
  steer audio from an application running in the window to a headphone jack in an array of headphone jacks, where the headphone jack is a headphone jack in the array of headphone jacks closest to the deduced user position.

24. The system according to claim 23, where determining the position further comprises determining a central position of a bottom edge of the window.

25. The system according to claim 23, where determining the position further comprises determining a central position of a bottom edge of the window.

26. The system according to claim 23, where the processor iterates the determining, deducing and steering for another window displayed on the display.

* * * * *